United States Patent
Aggarwal et al.

(10) Patent No.: US 7,706,808 B1
(45) Date of Patent: Apr. 27, 2010

(54) ONE-CLICK SERVICE STATUS TRACKING AND UPDATES

(75) Inventors: Gautam Aggarwal, New Delhi (IN); Sean Handel, Moss Beach, CA (US)

(73) Assignee: Rearden Commerce, Inc., Foster City, CA (US)

( * ) Notice: Subject to any disclaimer, the term of this patent is extended or adjusted under 35 U.S.C. 154(b) by 124 days.

(21) Appl. No.: 11/178,074

(22) Filed: Jul. 7, 2005

(51) Int. Cl.
*H04M 3/00* (2006.01)
*H04W 24/00* (2009.01)
*H04M 1/00* (2006.01)
*H04W 68/00* (2009.01)

(52) U.S. Cl. ............ 455/456.1; 455/418; 455/456.3; 455/456.5; 455/456.6; 455/459; 455/550.1; 455/556.2

(58) Field of Classification Search ......... 455/418–420, 455/556.2, 560–561, 422.1, 435.1–435.3, 455/456.1–456.6, 457–461, 550.1, 466, 521, 455/415–417, 404.1, 404.2, 433–434, 410–411, 455/432.1, 440–441, 551, 565–566; 342/537.06, 342/357.12; 709/203, 219; 701/213–217, 701/300; 379/45; 340/539.12–539.13, 825.49, 340/989–994, 995.1
See application file for complete search history.

(56) References Cited

U.S. PATENT DOCUMENTS

| | | | |
|---|---|---|---|
| 5,513,126 A | | 4/1996 | Harkins et al. |
| 5,754,953 A | * | 5/1998 | Briancon et al. ............ 455/418 |
| 5,892,909 A | | 4/1999 | Grasso et al. |
| 5,963,861 A | * | 10/1999 | Hanson .................... 455/456.1 |
| 5,966,658 A | | 10/1999 | Kennedy et al. |
| 6,044,257 A | * | 3/2000 | Boling et al. ............ 455/404.2 |
| 6,091,956 A | | 7/2000 | Hollenberg |
| 6,157,945 A | | 12/2000 | Balma et al. |
| 6,169,955 B1 | * | 1/2001 | Fultz ......................... 701/200 |
| 6,249,252 B1 | | 6/2001 | Dupray |
| 6,336,072 B1 | | 1/2002 | Takayama et al. |
| 6,456,207 B1 | * | 9/2002 | Yen ........................... 340/994 |
| 6,466,161 B2 | * | 10/2002 | Turetzky et al. ........ 342/357.06 |
| 6,501,421 B1 | * | 12/2002 | Dutta et al. ............ 342/357.13 |
| 6,591,263 B1 | | 7/2003 | Becker et al. |
| 6,662,016 B1 | * | 12/2003 | Buckham et al. ............ 455/457 |

(Continued)

OTHER PUBLICATIONS

Orbitz, LLC, search results of online search for flights at www.orbitz.com, Mar. 11, 2009.

(Continued)

*Primary Examiner*—Meless N Zewdu
(74) *Attorney, Agent, or Firm*—Greenberg Traurig, LLP

(57) ABSTRACT

A system and method to one-click service status tracking and updates. In one embodiment, in response to activation of a mobile device, providing GPS location information of the mobile device; the mobile device registering with a server to identify a user of the mobile device with a service and a service provider of the service; and the mobile device providing to the user real-time status information related to the service. In one embodiment, at least one of the service provider and user are in transit. In one embodiment, the information received from the server includes one of the service provider ID and contact info for the user to contact the service provider directly. In one embodiment, the activation includes a single click of a feature on the mobile device.

18 Claims, 5 Drawing Sheets

U.S. PATENT DOCUMENTS

| | | | |
|---|---|---|---|
| 6,837,427 | B2 | 1/2005 | Overhultz et al. |
| 6,970,871 | B1 * | 11/2005 | Rayburn ............... 707/10 |
| 6,980,993 | B2 | 12/2005 | Horvitz et al. |
| 7,013,149 | B2 | 3/2006 | Vetro et al. |
| 7,024,205 | B1 * | 4/2006 | Hose ............... 455/456.1 |
| 7,072,666 | B1 * | 7/2006 | Kullman et al. ......... 455/456.1 |
| 7,072,886 | B2 | 7/2006 | Salmenkaita et al. |
| 7,124,024 | B1 | 10/2006 | Adelaide et al. |
| 7,139,978 | B2 | 11/2006 | Rojewski |
| 7,280,823 | B2 | 10/2007 | Ternullo et al. |
| 7,283,970 | B2 | 10/2007 | Cragun et al. |
| 7,284,002 | B2 | 10/2007 | Doss et al. |
| 7,287,093 | B2 * | 10/2007 | Lynch et al. ............ 709/246 |
| 7,289,812 | B1 | 10/2007 | Roberts et al. |
| 7,296,017 | B2 | 11/2007 | Larcheveque et al. |
| 7,330,112 | B1 | 2/2008 | Emigh et al. |
| 7,426,537 | B2 | 9/2008 | Lee et al. |
| 7,430,724 | B2 | 9/2008 | Othmer |
| 7,441,203 | B2 | 10/2008 | Othmer et al. |
| 2002/0000930 | A1 * | 1/2002 | Crowson et al. ......... 342/357.1 |
| 2002/0010604 | A1 | 1/2002 | Block |
| 2002/0049644 | A1 | 4/2002 | Kargman |
| 2002/0116266 | A1 | 8/2002 | Marshall |
| 2002/0118118 | A1 * | 8/2002 | Myllymaki et al. ...... 340/686.1 |
| 2002/0143655 | A1 | 10/2002 | Elston et al. |
| 2003/0028390 | A1 | 2/2003 | Stern et al. |
| 2003/0050964 | A1 | 3/2003 | Debaty et al. |
| 2003/0065556 | A1 * | 4/2003 | Takanashi et al. ............ 705/13 |
| 2003/0087648 | A1 * | 5/2003 | Mezhvinsky et al. ........ 455/456 |
| 2003/0120530 | A1 | 6/2003 | Casati et al. |
| 2003/0126095 | A1 | 7/2003 | Allen |
| 2003/0220835 | A1 | 11/2003 | Barnes, Jr. |
| 2003/0229900 | A1 | 12/2003 | Reisman |
| 2004/0014457 | A1 * | 1/2004 | Stevens ............... 455/414.1 |
| 2004/0076280 | A1 * | 4/2004 | Ando et al. ............ 379/220.01 |
| 2004/0181572 | A1 * | 9/2004 | Lee et al. ............... 709/200 |
| 2004/0203909 | A1 * | 10/2004 | Koster ............... 455/456.1 |
| 2004/0248551 | A1 * | 12/2004 | Rowitch et al. ............. 455/410 |
| 2005/0138187 | A1 | 6/2005 | Breiter et al. |
| 2005/0215247 | A1 * | 9/2005 | Kpbylarz ............... 455/426.01 |
| 2005/0255861 | A1 * | 11/2005 | Wilson et al. ............ 455/456.2 |
| 2006/0059023 | A1 * | 3/2006 | Mashinsky ................ 705/5 |
| 2006/0068787 | A1 * | 3/2006 | Deshpande et al. ...... 455/435.3 |
| 2006/0235754 | A1 | 10/2006 | Walker et al. |
| 2007/0162328 | A1 | 7/2007 | Reich |
| 2009/0030609 | A1 | 1/2009 | Orttung |
| 2009/0030742 | A1 | 1/2009 | Orttung |
| 2009/0030769 | A1 | 1/2009 | Orttung |

OTHER PUBLICATIONS

Reed, Dan et al., "More people find ways to squeeze fun into work trips; For many business travelers, taking family or friends on a trip at relatively low cost has become a handy job perk," USA Today, McLean VA, May 20, 2003, p. E12.

Sharkey, Joe, "Leisure activities are increasingly being fitted in to help make life on the road less of a grind," The New York Times, New York, N.Y., Apr. 18, 2001, p. C6.

* cited by examiner

| | |
|---|---|
| PROVIDER ID | |
| CUSTOMER ID | |
| LOCATION START | |
| TIME START | |
| LOCATION END | |
| TIME END | |
| PROV. COV. LOC | |
| CUST. COV. LOC | |

*FIG. 2*

ONE-CLICK SERVICE STATUS TRACKING AND UPDATES

FIELD OF THE INVENTION

This invention relates generally to one-click service status tracking and updates for mobile devices.

BACKGROUND OF THE INVENTION

When providing certain services in the field, it is often necessary for two parties to meet. For example, a taxi driver may need to meet its riders, or a limo driver may need to pick up a party at an airport. The better the available information is about the current location or the expected time of the meeting, the more efficient the service transaction and execution can be, thus saving time and money for both parties. Although location-based services have been available for some time, such services are typically oriented for single-party activities and are not very useful for providing services from one party to another party.

What is clearly needed is a system and method that allows any party in a transaction involving another party in motion to simply and quickly check the status of the transaction or service progress.

SUMMARY OF THE INVENTION

A system and method to one-click service status tracking and updates. In one embodiment, in response to activation of a mobile device, providing GPS location information of the mobile device; the mobile device registering with a server to identify a user of the mobile device with a service and a service provider of the service; and the mobile device providing to the user real-time status information related to the service. In one embodiment, at least one of the service provider and user are in transit. In one embodiment, the information received from the server includes one of the service provider ID and contact info for the user to contact the service provider directly. In one embodiment, the activation includes a single click of a feature on the mobile device.

BRIEF DESCRIPTION OF THE DRAWINGS

FIG. 2 a table to store data for a transaction, in addition to the other information, in accordance with one embodiment;

DETAILED DESCRIPTION OF THE INVENTION

Figure 1:
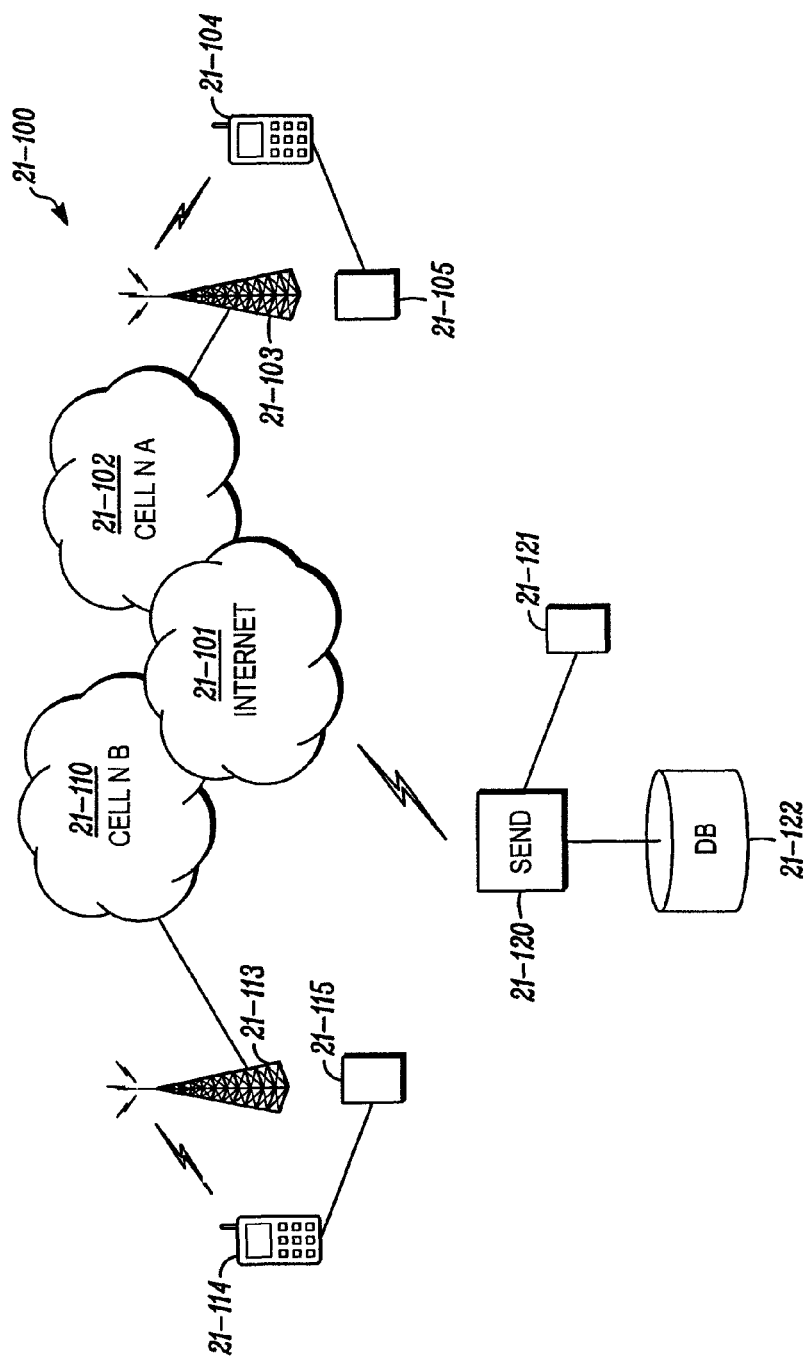
FIG. 1 illustrates an overview of a system according to one embodiment.

In the following detailed description of embodiments of the invention, reference is made to the accompanying drawings in which like references indicate similar elements, and in which is shown by way of illustration specific embodiments in which the invention may be practiced. These embodiments are described in sufficient detail to enable those skilled in the art to practice the invention, and it is to be understood that other embodiments may be utilized and that logical, mechanical, electrical, functional, and other changes may be made without departing from the scope of the present invention. The following detailed description is, therefore, not to be taken in a limiting sense, and the scope of the present invention is defined only by the appended claims.

One embodiment as described herein comprises a software instance (the Rearden Solution) embedded and packaged in cell phones, letting both the suppliers and consumers have the capabilities of single click tracking communication with each other. The front runner service to be exploited is the E911 GPS enabled service embedded in cell phones in the United States and Canada and similar technology in other places and countries.

For example, a passenger (the consumer) is waiting for his limo driver at JFK airport. Real time status of the limo driver's whereabouts can be obtained by tracking through the passenger's cell phone. Similarly, the driver (the supplier) can get real-time location information of where the passenger is. For the passenger, instead of waiting for the limo driver at the airport's arrivals area, he could maximize better use of his limited time and let the limo driver locate him at his exact location.

Similarly, this approach can be expanded into package shipping services to locate the pickup guy. In the future, the airline industry could use it to track passengers instead of announcing it on the airport pager system. Additional expansion beyond those immediate examples will allow for a more productive work force for the future and allow a company to be well equipped to confront the challenges of a demanding and volatile business world.

The service would embed a small application into wireless devices and have a single click option called "Make Me Available." Once clicked, the wireless device would be authorized to be used outside of E911 service. For instance, if the limo driver clicks this button, he makes himself available for tracking. Anytime the passenger wants to know the driver's whereabouts, he would click on "Status of Supplier/Service." He would then receive real-time data with a small map of the driver's precise location.

Similarly, if the passenger has made himself available, the limo driver can log on his mobile phone browser and click on "Status of Current Pick up" and get the passenger's exact location.

All this would use the GPS capability built into cell phones to get the current geocode data of a user and transmit it over the Internet to a centralized location server that would co-relate the services data from the (Rearden Services) assistant and itself for status reports and real time feeds.

As another example, the service would enable a small application that resides on that device to have one button (hardware or software button) called "Hail Taxi". The button, when pressed, would cause the device/application to look up the user's current coordinates using the GPS capability in his phone. The coordinates would be transmitted over the mobile network or Internet to a central server where a lookup/directory would find the local taxi providers. Once the local preferred providers are identified, the service would call one or more of their dispatch systems, either through an automated interface such as XML call over the internet or by automated voice phone call using text to speech. The system would tell the dispatch person/system of the user's location and ask to send a taxi over immediately. Additional information could be collected if needed, such as how long it would take to have the taxi there (ETA) and which taxi has been dispatched. This information would be presented back to the user on his device, either on the device display or through another means such as an automated phone call back. The user would also have the ability to track the particular taxi that has been dispatched because the taxi may have a GPS receiver/transmitter in its car as well. The user could see in real time how far away the taxi is or see it on a map.

FIG. 1 shows an overview of the system 21-100 according to the novel art of this disclosure. Said system contains a server 21-120 connected through the Internet 21-101 to several data cell networks, in particular, in this example, cell networks 21-102 and 21-110. Server 21-120 contains a software instance 21-121 of the Rearden Service Platform One-Click Service Status Tracking. Server 21-120 also has access to database 21-122, where all the necessary data can be stored and from which said data can be retrieved. Also shown are two parties with cell phones 21-101 and 21-114. Cell phone 21-104 belongs to a customer and contains software instance 21-105. It is connected via cell tower 21-103 to cell network A 21-102. Similarly, cell phone 21-114 belongs to a service provider and contains software instance 21-115. It is connected via cell tower 21-113 to cell network B 21-110. While the exemplary system 21-100 shows two parties, each with his own cell network, it is clear that in other cases the two parties' cell phones may use the same cell network. This system 21-100 according to the novel art of this disclosure allows for connectivity in the field in a very quick and efficient manner.

FIG. 2 shows a table 21-200 that would typically store data for a transaction, in addition to the normal information available for a transaction through current art. For example, this information may be stored as part of the data in the Rearden Commerce Platform (discussed above as Talaris Services Platform) Starting at the top, the table rows contain a provider ID 21-201 and a customer ID 21-202, to identify them on the wireless networks. Typically each ID could be a cell phone number, a dynamic IP address, or other similar unique data. The next rows show a location starting point 21-203, which could be, for example, the pick-up point for a limo ride, and the scheduled starting time 21-204. Similarly, the following rows show a location ending point 21-205, for example, the drop-off point of a limo ride, and the estimated ending time 21-206. The last two rows show the provider's current location 21-207 and the customer's current location 21-208, although in some cases either party also may have the option to not make his location known, if desired.

Figure 3:
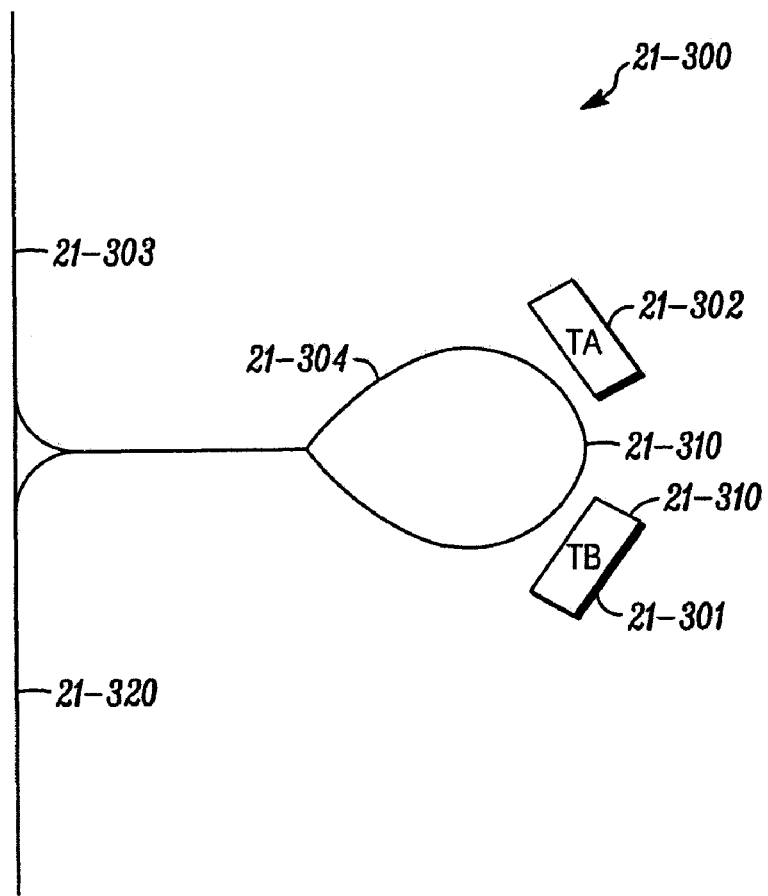
FIG. 3 illustrates an overview diagram of a typical airport.

FIG. 3 shows an overview diagram of a typical airport 21-300. Provider 21-320 is approaching the airport on freeway 21-303. A customer, when arriving at the airport, initially activates his location at 21-310' in Terminal B 21-301. Later, upon reaching the sidewalk outside the terminal, the customer updates his location to his new location 21-310. Based on information from the service provider, the customer's cell phone may then calculate the estimated time until the arrival of the provider, and may also send information, based on the customer's GPS location, telling the service provider that the customer's location 21-310 is, for example, near door 10 in Terminal B 21-301.

Figure 4:
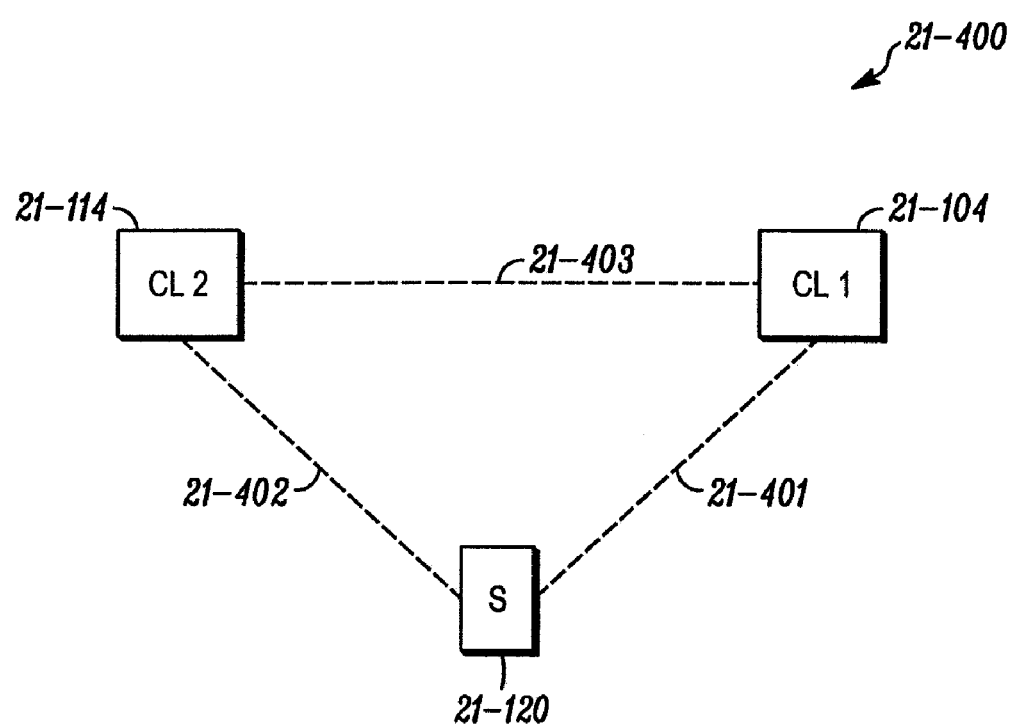
FIG. 4 illustrates a block diagram in accordance with one embodiment.

FIG. 4 shows a part of the novel art of this disclosure. The two cell phones 21-104 and 2-114 of the customer and the service provider, respectively, can communicate not only with server 21-120 through connections 21-401 and 21-402, respectively, but can also have direct IM-style exchange of information through direct link 21-403. This exchange may done using SMS, IM, or any other similar suitable type of direct communication.

Figure 5:
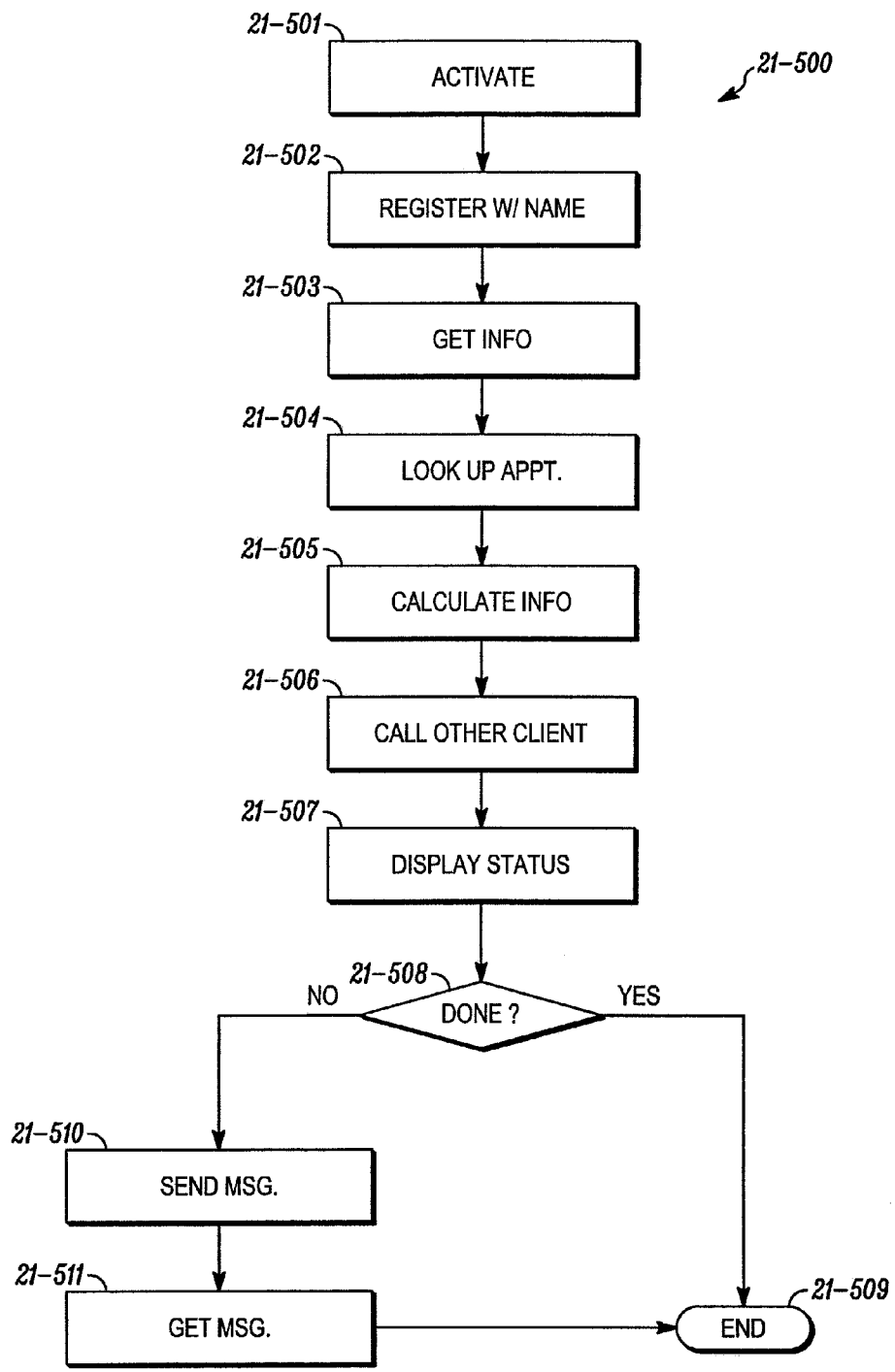
FIG. 5 illustrates a process of a one-click update according to one embodiment.

FIG. 5 shows an overview 21-500 of an example process of a one-click update according to the novel art of this disclosure. In step 21-501, the customer may active his cell phone's one-click update function, at the same time activating the release of GPS location information. In step 21-502 the customer's cell phone registers with the server, and in step 21-503 the cell phone receives information from the server. In some cases, this may only be the service provider's ID and contact information, so the customer can contact the provider directly. In other cases, however, the customer may read the complete record of the service provider from the server. In step 21-504 information related to the transaction is looked up in the server or the device itself (or requested from the other device) and in step 21-505 data such as distance, elapsed time, time of meeting, etc., are calculated. The result of the calculations may also lead to instructions (based on additional rules, not shown here, or entry by the other party that may also be stored in the server or device, etc.), such as "Go to door 10," or "Go to door 3 instead," etc. Additional information may now be exchanged directly, as described above in the discussion of FIG. 4, in step 21-506. Then instep 21-507 the actual status of the service (progress) is displayed to the customer (or other involved party, etc.). The process branches at step 21-508. In some cases, the process may terminate at step 21-509. In other cases, additional information or messages may be exchanged, as shown in steps 21-510 and 21-511. For example, the customer may send a message to the service provider in step 21-510 saying that he wears a blue jacket, and the provider may reply, in step 21-511, that he sees the customer. When all messages are exchanged, the process then terminates in step 21-509.

The processes described above can be stored in a memory of a computer system as a set of instructions to be executed. In addition, the instructions to perform the processes described above could alternatively be stored on other forms of machine-readable media, including magnetic and optical disks. For example, the processes described could be stored on machine-readable media, such as magnetic disks or optical disks, which are accessible via a disk drive (or computer-readable medium drive). Further, the instructions can be downloaded into a computing device over a data network in a form of compiled and linked version.

Alternatively, the logic to perform the processes as discussed above could be implemented in additional computer and/or machine readable media, such as discrete hardware components as large-scale integrated circuits (LSI's), application-specific integrated circuits (ASIC's), firmware such as electrically erasable programmable read-only memory (EE-PROM's); and electrical, optical, acoustical and other forms of propagated signals (e.g., carrier waves, infrared signals, digital signals, etc.); etc.

It is clear that many modifications and variations of this embodiment may be made by one skilled in the art without departing from the spirit of the novel art of this disclosure.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in them selves recite only those features regarded as essential to the invention.

What is claimed is:

1. A computer-implemented method comprising:
   in response to an activation of a first mobile device of a user to allow location tracking of the first mobile device, receiving from the first mobile device, via a computing device, a request for a service from a service provider, wherein the activation is a single click of a feature on the first mobile device;
   in response to an activation of a second mobile device of the service provider to allow location tracking of the second mobile device, receiving from the second mobile device an indication of location of the second mobile device, wherein the activation is a single click of a feature on the second mobile device;

selecting the service provider to perform the service based at least in part on a location of the service provider in relation to the user;

providing to the first mobile device a location of the service provider based on the location tracking of the second mobile device;

providing to the second mobile device a location of the user based on the location tracking of the first mobile device;

generating a real-time representation of a location tracking information about the service provider on a map to be displayed on the first mobile device;

calculating a distance between the user and the service provider and time of a meeting of the user and the service provider;

in response to the calculating, providing rules-based geographic instructions to the first mobile device to facilitate the meeting between the user and the service provider; and concealing the location of at least one of the user and the service provider upon request.

2. The method of claim 1, wherein at least one of the first service provider and the first mobile device are in transit.

3. The method of claim 2, wherein the first mobile device is a cellular phone.

4. The method of claim 3, wherein the activation is activation of E911.

5. The method of claim 1, further including transmitting information to the first mobile device in response to the activation of the first mobile device.

6. The method of claim 1, wherein the method is performed by an application embedded in the first mobile device.

7. The method of claim 5, wherein information received from the server includes one of a service provider ID and contact information to contact the service provider directly.

8. The method of claim 1, wherein the first mobile device is a wireless mobile device.

9. The method of claim 1, further comprising providing location data identifying a real-time location of the service provider and the first mobile device.

10. The method of claim 1, wherein the method is performed by an application embedded in a server in communication with the first mobile device.

11. A computer system comprising
at least one server for:
in response to an activation of a first mobile device of a user to allow location tracking of the first mobile device, receiving from the first mobile device, via a computing device, a request for a service from a service provider, wherein the activation is a single click of a feature on the first mobile device;
in response to an activation of a second mobile device of the service provider to allow a location tracking of the second mobile device, receiving from the second mobile device an indication of location of the second mobile device, wherein the activation is a single click of a feature on the second mobile device;
selecting the service provider to perform the service based at least in part on the location of the service provider in relation to the user;
providing to the first mobile device the location of the service provider based on location tracking of the second mobile device;
providing to the second mobile device a location of the user based on the location tracking of the first mobile device;
generating a real-time representation of the location tracking information about the service provider on a map to be displayed on the first mobile device;
calculating a distance between the user and the service provider and time of a meeting of the user and the service provider;
in response to the calculated distance, providing rules-based geographic instructions to the first mobile device to facilitate the meeting between the user and the service provider; and
concealing the location of at least one of the user and the service provider upon request.

12. The system of claim 11, wherein at least one of the service provider and first mobile device are in transit.

13. The system of claim 11, wherein the first mobile device is activated by a single click of a feature on the first mobile device.

14. A tangible machine readable medium having stored thereon a set of instructions which when executed, perform a method comprising:
in response to an activation of a first mobile device of a user to allow location tracking of the first mobile device, receiving from the first mobile device a request for a service from a service provider, wherein the activation is a single click of a feature on the first mobile device;
in response to an activation of a second mobile device of the service provider to allow location tracking of the second mobile device, receiving from the second mobile device an indication of the location of the second mobile device, wherein the activation is a single click of a feature on the second mobile device;
selecting the service provider to perform the service based at least in part on a location of the service provider in relation to the user;
providing to the first mobile device the location of the service provider based on the location tracking of the second mobile device;
providing to the second mobile device a location of the user based on the location tracking of the first mobile device;
generating a real-time representation of the location tracking information about the service provider on a map to be displayed on the first mobile device;
calculating a distance between the user and the service provider and time of a meeting of the user and the service provider;
in response to the calculated distance, providing rules-based geographic instructions to the first mobile device to facilitate the meeting between the user and the service provider; and concealing the location of at least one of the user and the service provider upon request.

15. The machine readable medium of claim 14, wherein the method further includes:
in response to a one-click activation of the first mobile device, receiving registration information from the first mobile device; and
providing to the first mobile device contact information and an identification of the service provider.

16. The machine readable medium of claim 15, wherein the method further includes:
obtaining information regarding a transaction;
calculating data based on the information regarding the transaction; and providing instruction to the first mobile device based on the calculated data.

17. The machine readable medium of claim 14, wherein the method further includes storing in a server information about a transaction, the information including at least four of a service provider identification, a customer identification, a location starting point, a scheduled starting time, a location ending point, an estimated ending time, a current location of a service provider, and a current location of a customer.

18. The machine readable medium of claim 14, wherein the method further comprises generating the real-time representation of the location tracking information of the service provider on a map to be displayed on the first mobile device.

* * * * *